United States Patent
Moskowiz et al.

(10) Patent No.: US 10,013,319 B2
(45) Date of Patent: Jul. 3, 2018

(54) DISTRIBUTED BASEBOARD MANAGEMENT CONTROLLER FOR MULTIPLE DEVICES ON SERVER BOARDS

(71) Applicant: FREESCALE SEMICONDUCTOR, INC., Austin, TX (US)

(72) Inventors: Avishay Moskowiz, Tel-Aviv (IL); Amitay Beler, Herzelia (IL); Ira Kalman, Herzelia (IL)

(73) Assignee: NXP USA, Inc., Austin, TX (US)

( * ) Notice: Subject to any disclaimer, the term of this patent is extended or adjusted under 35 U.S.C. 154(b) by 148 days.

(21) Appl. No.: 15/229,772

(22) Filed: Aug. 5, 2016

(65) Prior Publication Data
US 2018/0039552 A1    Feb. 8, 2018

(51) Int. Cl.
*G06F 11/00* (2006.01)
*G06F 11/20* (2006.01)
*G06F 3/06* (2006.01)

(52) U.S. Cl.
CPC ............ *G06F 11/203* (2013.01); *G06F 3/067* (2013.01); *G06F 3/0619* (2013.01); *G06F 3/0653* (2013.01); *G06F 2201/805* (2013.01); *G06F 2201/835* (2013.01)

(58) Field of Classification Search
USPC .......................................................... 714/11
See application file for complete search history.

(56) References Cited

U.S. PATENT DOCUMENTS

| | | | |
|---|---|---|---|
| 5,572,674 A | 11/1996 | Ernst | |
| 5,655,081 A | 8/1997 | Bonnell et al. | |
| 6,141,759 A | 10/2000 | Braddy | |
| 6,725,317 B1 | 4/2004 | Bouchier et al. | |
| 6,854,069 B2 | 2/2005 | Kampe et al. | |
| 6,931,568 B2 | 8/2005 | Abbondanzio et al. | |
| 7,350,090 B2 | 3/2008 | Baurer et al. | |
| 2003/0069953 A1 | 4/2003 | Bottom et al. | |
| 2005/0240669 A1 | 10/2005 | Khanna et al. | |
| 2005/0251798 A1 | 11/2005 | Fraley | |

(Continued)

OTHER PUBLICATIONS

IPMI, "Intelligent Platform Management Interface Specification Second Generation," Sections 1, 3, 4, 20, 27, and 28; v 2.0, document rev. 1/1, Oct. 1, 2013; Intel, Hewlett-Packard, NEC, Dell; downloaded from <<http://www.intel.com/content/dam/www/public/us/en/documents/product-briefs/ipmi-second-gen-interface-spec-v2-rev1-1.pdf>>; 78 pages.

*Primary Examiner* — Sarai E Butler (57) ABSTRACT

A server board includes first and second devices. A first service processor of the first device operates as a master baseboard management controller of the server board, and monitors a communication channel for alive messages from a plurality service processors. A second service processor operates as a secondary baseboard management controller, and sets a second timer to a first value. In response to a determination that the second timer has expired based on a first value: the second service processor to start a switchover process, and to set the second timer to a second value based on an alive message period. In response to a primary alive message not being received from the first service processor prior to the second timer expiring based on the second value, the second service processor to reset first service processor and to operate as the master baseboard management controller.

20 Claims, 7 Drawing Sheets

(56) References Cited

U.S. PATENT DOCUMENTS

| | | | |
|---|---|---|---|
| 2015/0195669 A1* | 7/2015 | Grover | H04W 4/003 455/414.1 |
| 2016/0099886 A1* | 4/2016 | Rao | G06F 9/5061 709/226 |
| 2017/0168530 A1* | 6/2017 | Remis | G06F 1/206 |

* cited by examiner

DISTRIBUTED BASEBOARD MANAGEMENT CONTROLLER FOR MULTIPLE DEVICES ON SERVER BOARDS

BACKGROUND

Field of the Disclosure

Server boards can be used in a data center for computing, networking or storage applications. These server boards typically have a single centralized baseboard management controller (BMC). The BMC can utilize protocols, such as those put further in the Intelligent Platform Management Interface (IPMI) standard, to monitor and control other components of the server board. The BMC can monitor and control the components to help ensure that they are available, to perform load balancing, and to collect statistics from these components. The BMC can utilize a dedicated memory, dedicated communication ports, and dedicated power supply circuitry on the server board. As such, the cost of the server board increases to include the BMC functionality on top of the basic server board components. Additionally, failure of the single BMC can cause the entire server board to fail.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A server board includes multiple devices each having one or more processors, multiple processor memories corresponding to the devices, and a shared system memory in accordance with at least one embodiment of the present disclosure. Each device includes a respective service processor, multiple general purpose processors, and a memory controller. Each of the service processors can monitor the components on its corresponding device. The service processors operate together to implement a distributed baseboard management controller (BMC). According to an embodiment, one of the service processors is a primary BMC that coordinates implementing BMC functionality for the server board, while each of the other service processors are slave BMCs that operate in a defined manner to support the master BMC.

One or more of the slave BMCs can be a secondary master that, in addition to implementing slave operations, monitors the health of the primary BMC. Therefore, the server board includes a distributed BMC architecture that allows one service processor to operate as a master BMC, another service processor to operate as a slave and a secondary BMC, and the remaining service processors to operate as slave BMCs. The slave service processors can provide alive messages to a communication bus that is indicative of their corresponding devices operating normally. The master BMC can detect the presence, or lack, of the alive messages at the communication bus from the other service processors. The master BMC service processor can manage expiration timer values corresponding to each of the other service processors to monitor whether valid alive messages are received from each of the other service processors within an expected amount of time, thus tracking the status of the other service processors. The master BMC can implement appropriate remedial actions with respect to the other service processors when a possible failure is detected.

In a further embodiment, while the master BMC service processor monitors the other BMC service processors, the secondary BMC service processor monitors the master BMC service processor to determine whether the master BMC service processor has failed. The secondary BMC can implement appropriate remedial actions with respect to the master service processors when a possible failure is detected, or even switch-over to operate as the master BMC. By distributing the BMC functionality across the service processors of the server board, there is no need for an additional device that implements BMC functionality to monitor the devices of the server board.

FIGS. 1-5 illustrate a server board 100 in accordance with at least one embodiment of the present disclosure. The server board 100 includes a plurality of devices 102, 104, 106, and 108 (devices 102-108), multiple processor memories 110, 112, 114, and 116 (memories 110-116), and a shared system memory 118. In an embodiment, devices 102-108 are presumed to be have homogenous architectures, and as such each have similar features as indicated by the unit values of their corresponding reference numbers. For example, each of the devices 102-108 can include a corresponding one of service processors 120, 130, 140, and 150 (service processors 120-150), a corresponding one of general purpose processors 122, 132, 142, and 152 (general purpose processors 122-152), a corresponding one of memory controllers 124, 134, 144, and 154 (memory controllers 124-154). In different embodiments, the service processors 120-150 can be processors of the same or different type architecture as the general purpose processors 122-152. Each of the service processors 120-150 can include baseboard management controllers (BMC) 126, 136, 146, or 156 (BMCs 126-156) that implement baseboard management controller functionality by operating together to implement a distributed BMC. Each of the service processors 120-150 can include a corresponding timer 128, 138, 148, or 158. The timers 128, 138, 148, and 158 (timers 128-158) have been illustrated as part of the respective service processors 120, 130, 140, and 150. However, the timers 128-158 may be external to the respective service processors 120-150 without varying from the scope of this disclosure.

Figure 1:
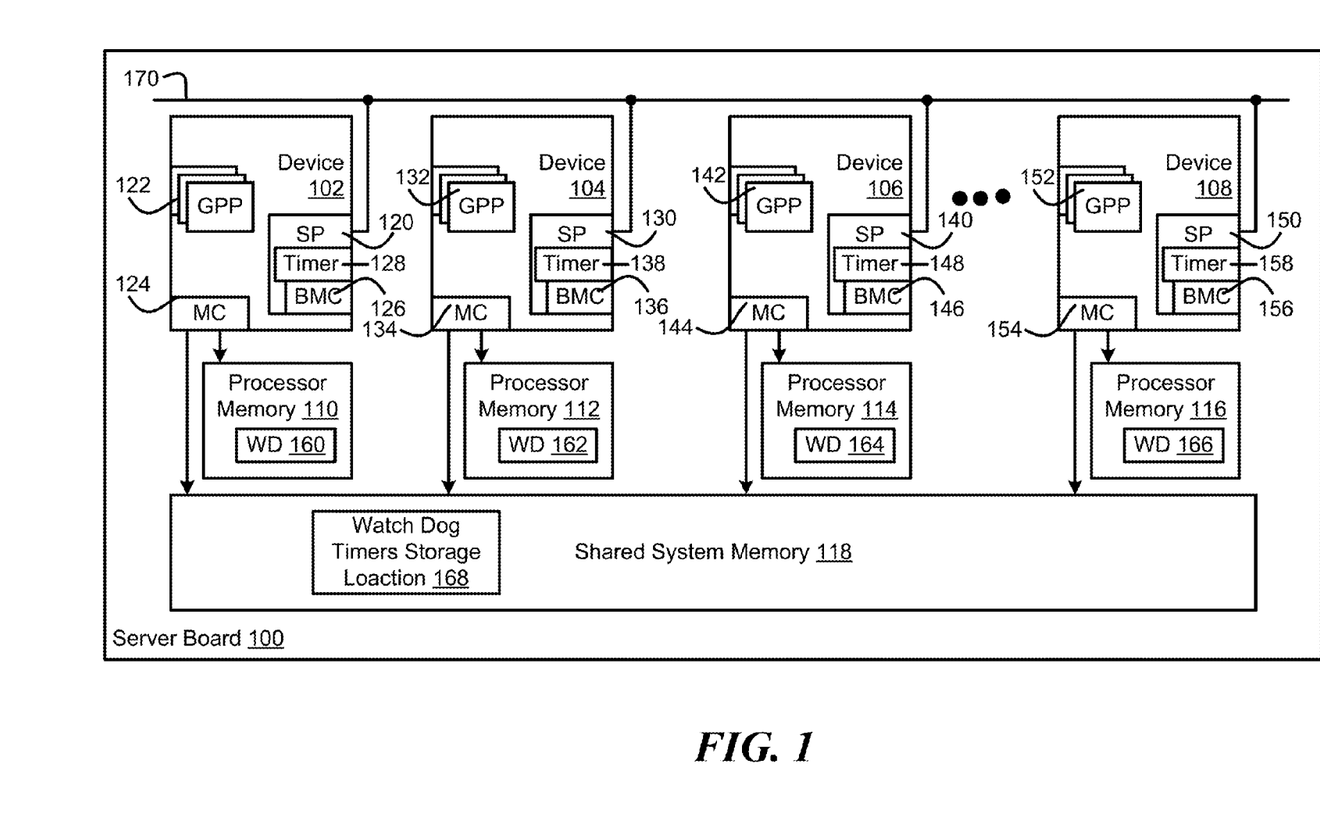
FIGS. 1-5 illustrate a server board in accordance with at least one embodiment of the present disclosure.

Each of the processor memories 110-116 include a storage location 160, 162, 164, or 166 (storage locations 160-166) that is used to store timer information used to implement a corresponding watch dog (WD) timer. The shared system memory 118 includes a storage location 168 to store WD timer information for each of the service processors 120-150 storage location 168. The plurality of devices 102-108 can utilize their respective memory controllers 124-154 to communicate with the shared system memory 118 and with their corresponding processor memories 110-116. The devices 102-108 can communicate with one another via a communication bus 170. In an embodiment, the service processors 102-108 can communicate in compliance with the Intelligent Platform Management Interface (IPMI) standard.

During operation, the service processors 120-150 can provide on-chip debug processes and implement various WD timers to monitor on-chip processing by storing appropriate values in the storage locations 160-166 of the respective processor memories 110-116. For example, a separate time value can be stored at location WD 160 for each one of the general purpose processors 122 to monitor its health. Thus, the service processor 120 can monitor alive messages from each of the general purpose processors 122, wherein an alive message can indicate that a corresponding general purpose processor 122 is working properly. Upon receiving an alive message from one of the general purpose processors 122, the service processor 120 can update a watch dog timer value in the storage location 160 that corresponds to the general purpose processor 122 that provided the alive message. Should a time implementing this watch dog timer value expire before receiving a next alive indicator from the same general purpose processor, it can be an indication that there is a problem with the particular processor.

The BMC 126 of service processor 120 can be implemented by executing code at an instruction processor of service processor 120 that implements master BMC functionality for the server board 100. The service processor 130 of device 104 can execute the code to implement slave BMC functionality and secondary BMC functionality of device 104. The service processors 140 and 150 of devices 106 and 108, respectively, can execute the code to implement slave BMC functionality for their respective devices, as described in greater detail below with respect to FIGS. 2-5 below.

In an embodiment, each of the service processors 120, 130, 140, and 150 can operate to implement a portion of a distributed BMC architecture with service processor 120 as the master BMC, service processor 130 as the secondary BMC, and service processors 140 and 150 as slave BMCs. For brevity and clarity, only four devices have been shown within server board 100. However, server board 100 may include additional or fewer devices within without varying from the scope of this disclosure.

Figure 2:
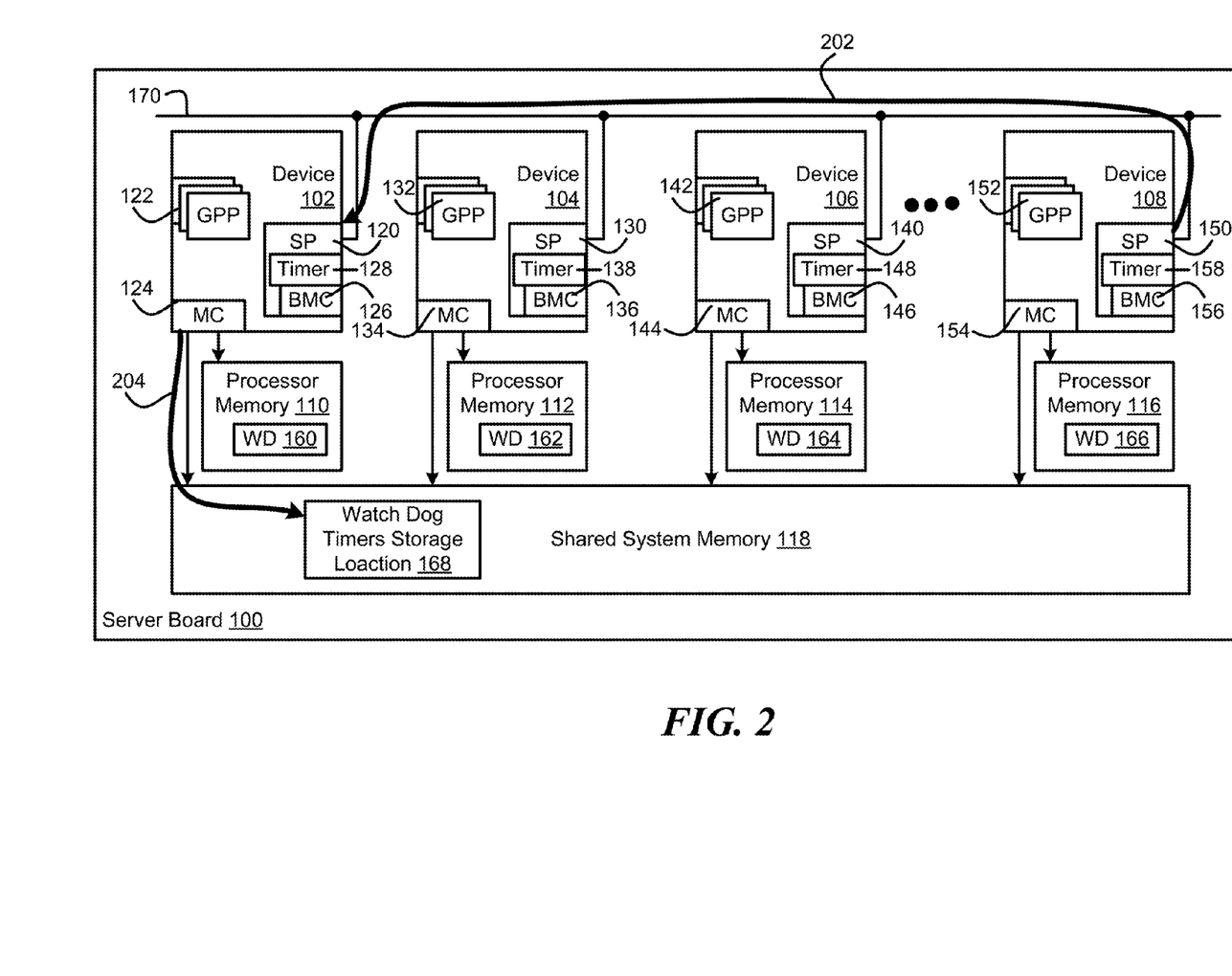

Referring to FIG. 2, each of the service processors 130, 140, and 150 can implement BMC slave functionality by periodically writing an alive message/indicator to the communication bus 170 to indicate it is operating properly. The service processor 120 operates as the master BMC to monitor the communication bus 170 for alive messages from the service processors 130, 140, and 150. As the master BMC, the service processor 120 can have ownership of the storage location 168 of the shared system memory 118, and can store respective expiration timer values for each one of the service processors 120, 130, 140, and 150 (e.g., $WD_{120}$, $WD_{130}$, $WD_{140}$, and $WD_{150}$) in the storage location 168. A particular expiration timer value can be updated by the master BMC, e.g., the service processor 120, in response to an alive message being received from its corresponding service processor. For example, expiration timer value $WD_{150}$ can be updated each time service processor 120 detects an alive message from service processor 150. The expiration timer values $WD_{130}$, $WD_{140}$, and $WD_{150}$, can be utilized by the service processor 120 to track the status of the other service processors 130, 140, and 150 as discussed in greater detail below.

The service processor 150 can provide an alive message 202, represented in FIG. 2 by arrow 202, to the service processor 120 via the communication bus 170. In response to receiving the alive message 202, the service processor 120 can determine that the service processor 150 is alive, e.g., working properly. In an embodiment, the determination that a service processor, such as service processor 150, is working properly in turn means that the service processor 150 has determined other components of the device 108, e.g., general purpose processors 152, are also working properly.

In response to determining that service processor 150 is alive, the service processor 120 can write a new expiration timer value, $WD_{150}$, for the service processor 150 in the watch dog expiration timer's storage location 168, as represented by the arrow 204 in response to receiving the alive message 202. In an embodiment, the new expiration timer value can be set to a time stamp of device 102 ($TS_{102}$) plus a failure indication period (FIP), such that $WD_{150}=TS_{102}+$ FIP. In an embodiment, the time stamp can be a clock time of device 102 when the alive message 202 is received at the service processor 120, and the failure indication period can be a preset length of time between when a single slave BMC is expected to provide two successive alive messages.

It will be appreciated, that the service processor 120 can maintain the value of timer 128 to be the value of the next to expire expiration timer value in the watch dog expiration timer storage location 168, assuming no other timers are being implemented using timer 128. In an embodiment, the next to expire expiration timer value will generally not be the expiration timer value that the service processor 120 updated most recently, e.g., $WD_{150}$, because this updated value will most likely be later in time than the expiration timer value for either service processor 130 or 140. Therefore, the next to expire expiration timer value will correspond to either service processor 130 or service processor 140. For example, the next to expire expiration timer value can correspond to the service processor 140, $WD_{140}$. In an embodiment, the value set in the timer 128 can be a specific time value of the clock for the service processor 120, and the timer 128 can expire when that point in time is reached.

In an embodiment, each of the other service processors, e.g., service processors 130 and 140, also operates as a slave BMC, allowing the service processor 120 to monitor each device of the server board 100 having a slave BMC in a similar way as described above with respect to device 108 and service processor 150. In an embodiment, the service processor 130 of device 104 additionally operates as a secondary master BMC device that can monitor alive messages from service processor 120, in case of failure of device 102, in a similar fashion as service processor 120 monitors the devices 104-108, as will be discussed in greater detail below.

Figure 3:
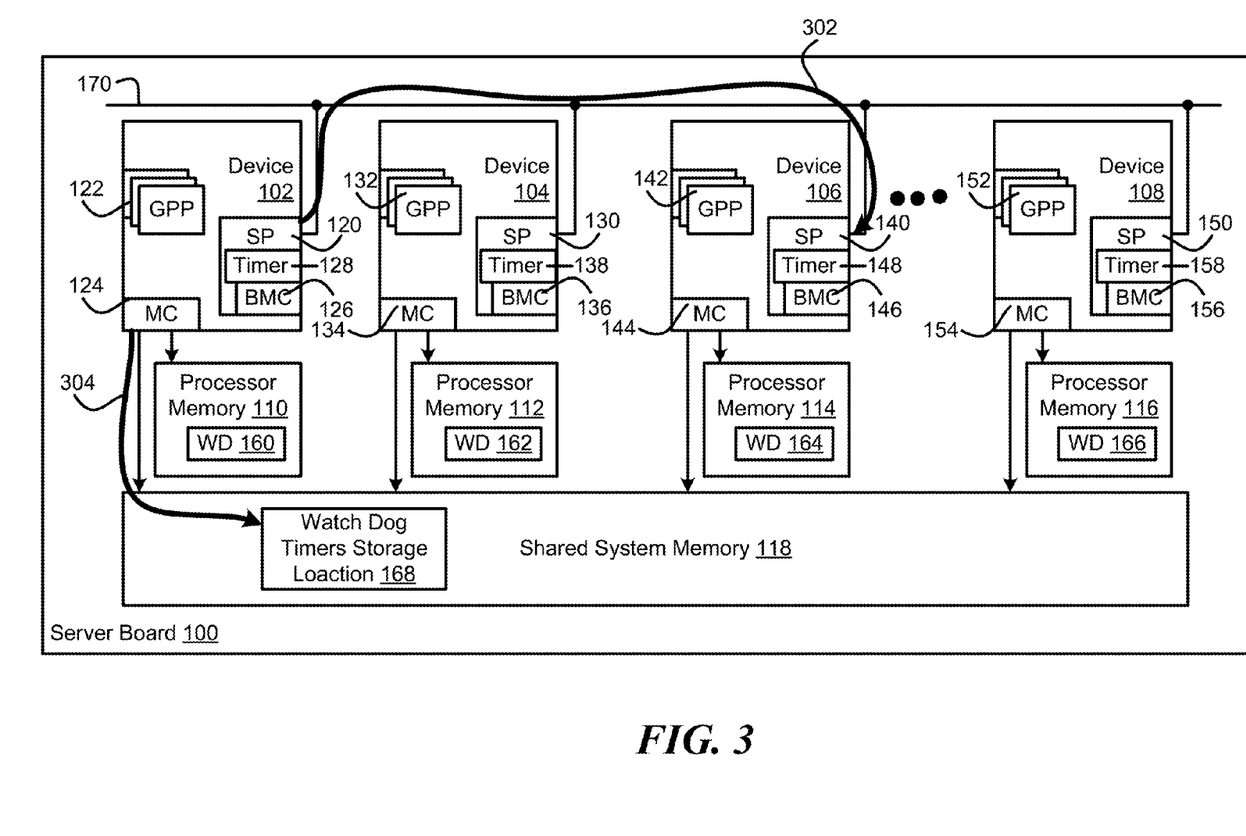

Referring now to FIG. 3, the service processor 120 can detect that the timer 128 has expired. In an embodiment, the timer 128 was previously set to the next to expire expiration timer value, presumed to be $WD_{140}$ of the service processor 140. In this embodiment, the expiration of the timer 128 can cause the service processor 120 to make the determination that the service processor 140, or one of the other components within device 106, has failed or may have failed. In response, the service processor 120 can attempt to implement remedial operations, such as communicating with service processor 140, providing a reset signal 302 to service processor 140, which in turn can cause a service processor 140 to implement a reset operation on one or more of the components within the device 106. E.g., the service processor 140, the general purpose processors 142, the memory controller 144, and the timer 148.

After providing the reset signal 302, the service processor 120 can update the expiration timer value corresponding to the service processor 140, $WD_{140}$, in the storage location 168 via an update signal 304. In an embodiment, the updated expiration timer value, $WD_{140}$, can be the time stamp, $TS_{120}$, of when the reset signal 302 was sent to the service processor 140 plus a boot period, BP, (e.g., $WD_{140}=TS_{120}+BP$). In an embodiment, the boot period can be the length of time for the components of a device to complete a boot operation after being reset. The service processor 120 can then set the timer 128 to a value of the next to expire expiration timer value in the watch dog expiration timer's storage location 168. In an embodiment, the next to expire expiration timer value will not be the expiration timer value corresponding to service processor 140, $WD_{140}$, based on this expiration timer value being recently updated.

In different embodiments, each of the devices 102-108 can maintain different clocks or can have the same clock. In an embodiment where the devices 102-108 have the same clock, the service processors 120 and 130 (as will be discussed in greater detail below) can read and write expiration values to the storage location 168 without a time conversion needed. In an embodiment where the devices 102-108 maintain different clocks, the service processor 130 converts the expiration timer values in the storage location 168 to match the clock of the device 104.

Figure 4:
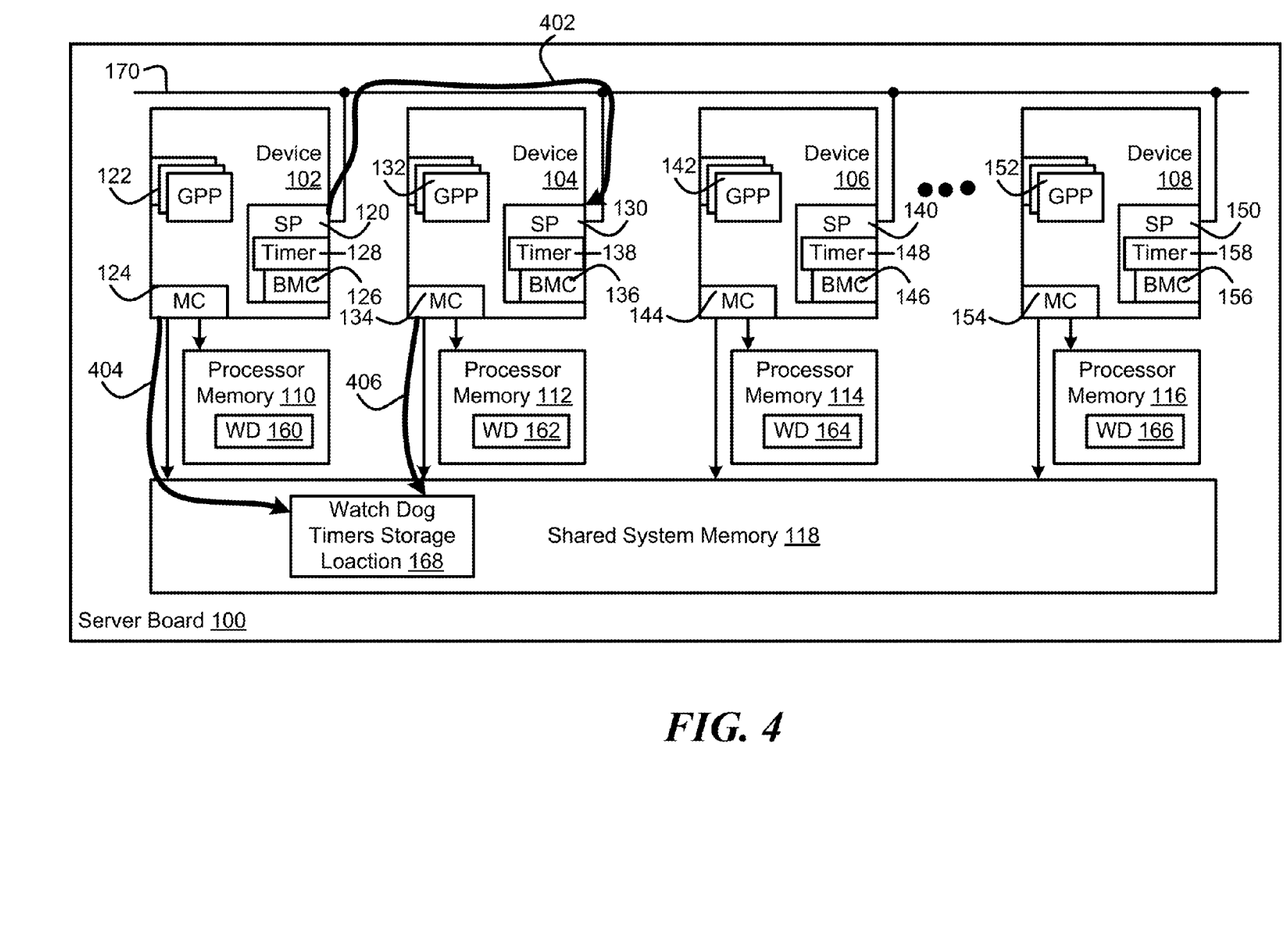

Referring now to FIG. 4, the service processor 120 can provide an alive message 402, referred to as a primary alive message, to the service processor 130. In an embodiment, the service processor 120 can send the primary alive message at regular intervals, and include a time stamp of the current time of in the clock of the service processor 120 being used to maintain the values stored in expiration timer 168. The service processor 120 can also update the expiration timer value for itself, $WD_{120}$, within the storage location 168, via an update message 404. In an embodiment, the new expiration timer value, $WD_{120}$, can be set to the time stamp, $TS_{120}$, plus the failure indication period, FIP.

The service processor 130 can utilize the time stamp in the primary alive message 402 to calculate a difference between the clock of the service processor 120 and its own clock, e.g., a clock of the service processor 130. Thus, the service processor 130 can calculate the difference between the clock of device 102 and the clock of device 104. The service processor 130 can then store this difference for later use to convert expiration timer values stored, by service processor 120, in the storage location 168 to the clock of device 104.

According to an embodiment, service processor 120 will send an alive message to the secondary service processor 130 each time service processor 120 receives an alive signal. Upon receiving an alive indicator from service processor 120, the secondary service processor 130 can determine when the next alive indicator is expected from the primary service processor 120 by reading the next to expire value from storage location 168. For example, after receiving an alive signal from the primary service processor 120, the secondary service processor 130 can send a retrieve message 406 to the storage location 168 to retrieve the timer value stored at location 168 that represents the next to expire expiration timer value, as maintained by the service processor 120. The service processor 130 can then utilize the clock difference to convert the retrieved next to expire expiration timer value to the clock of the device 104, which is then used to set the timer 138 to equal the adjusted next to expire expiration timer value. Should this timer expire it may be an indication that device 102 has failed, that device 106 has failed, or that devices 108 has failed. In one embodiment, the timer 138 can be set to a different value than the timer 128, such that the service processor 120 can have time to reset a failed device prior to the timer 138 expiring. In this embodiment, when the timer 138 expires the service processor 130 determines whether value of timer matches any value in storage location 168, if so this match may indicate that service processor 120 has failed.

Figure 5:
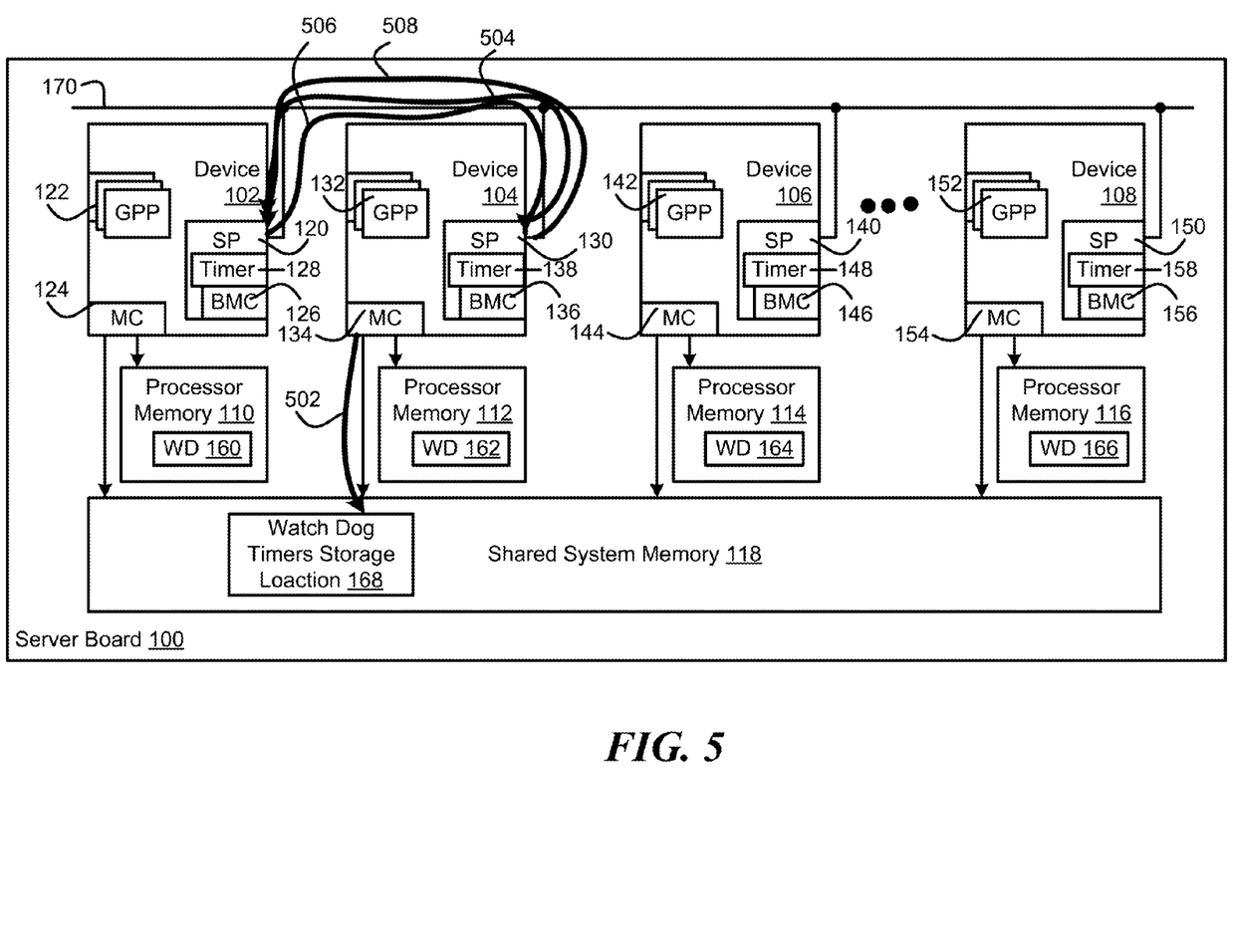

Referring now to FIG. 5, the service processor 130, operating as the secondary BMC, can detect that the service processor 120 may have failed, by determining that the timer 138 has expired. In an embodiment, upon the timer 138 expiring, e.g., the timer value stored in the timer 138 matching the value of the clock of the service processor 130, the service processor 130 will retrieve the next to expire expiration timer value from the storage location 168 via a retrieve signal 502. The service processor 130 can then compare the next to expire expiration timer value to the current value in the timer 138. In an embodiment, the clock of the service processor 120 and the clock of the service processor 130 can differ, such that the service processor 130 can utilize the saved clock difference to convert the next to expire expiration timer value from the clock of the service processor 120 to the clock of the service processor 130 prior to the comparison being performed.

The comparison of the current value of the timer 138 to the next to expire expiration timer value can result in two outcomes in the service processor 130. For example, if the next to expire expiration timer value is different from the current value of the timer 138, the service processor 130 can determine that all of the service processors, e.g., service processors 120, 140, and 150, are working properly, and the service processor 130 can set the timer 138 to the next to expire expiration timer value and continue operating as the secondary BMC as described below. However, if the next to expire expiration timer value is the same as the current value of the timer 138, the secondary processor 130 can determine that a failure has occurred in the server board 100, e.g., at one of the service processors 120, 140, or 150, as will be described below, by virtue of service processor 120 not updating the next to expire expiration value.

In an embodiment, the next to expire expiration timer value does not change within the storage location 168 if the service processor 120 does not provide an updated expiration timer value to the storage location 168. One situation that would cause the next to expire expiration timer value not to have changed, is that the service processor (e.g., service processor 140) corresponding to the next to expire expiration value has failed and the service processor 120 is in the process of resetting the service processor 140, such that the service processor 120 has not yet updated the expiration timer value for the service processor 140. Another situation that would cause the next to expire expiration timer value not to have changed, is that the service processor 120, e.g., the master BMC, has failed. Thus, the expiration of the timer 138 can cause the service processor 130 to retrieve the next to expire expiration timer value from the storage location 168 via the retrieve signal 502, then to convert the next to expire expiration timer value to the clock of the service processor 130, and compare the next to expire expiration timer value to the current value of the timer to determine if the next to expire expiration timer value has changed. In an embodiment, the matching of the current value of the timer 138 to the next to expire expiration timer value may or may not indicate a failure of the master BMC. Therefore, if these values match the service processor 130 needs to take further action to determine whether the master BMC has failed, as will be described in greater detail below.

Thus, the service processor 130 (operating as the secondary BMC) determines whether the service processor 120 (operating as the master BMC) or one of service processors 140 and 150 (operating as slave BMCs) has failed. The service processor 130 can start this determination process by sending an alive message request 504 to the service processor 120 to determine whether the service processor 120, operating as the master BMC, has failed by whether a primary alive message is received from service processor 120 in response to the alive message request 504. The service processor 130 can also start a context switch process. In an embodiment, the context switch process can cause the service processor 130 to take over operating as the master BMC. In an embodiment, the start of the context switch process can include retrieving and loading the code associated with the master BMC functionality 126 into the processor memory 112. In an embodiment, the master BMC functionality can include a reception address for the alive messages from service processors 140 and 150, ownership of the storage location 168 in the shared system memory 118, and the like.

After the service processor 130 has both sent the alive message request 504 and started the context switch process, the service processor 130 can set the timer 138 to a value equal to a time stamp plus an alive message period. In an embodiment, the alive message period can be a fixed period of time that the service processor 120 (operating as the master BMC) has to respond to the alive message request 504 if the service processor 120 has not failed. If the service processor 130 receives a primary alive message 506 from the service processor 120 within the alive message period, the service processor 130 can determine that the service processor 120 has not failed but that service processor 140 or 150 has failed. The service processor 130 can then stop the context switch process, can set the timer 138 to the next to expire expiration timer value from the storage location 168, and can continue to operate as the secondary BMC. In this situation, the service processor 120 will have already updated expiration value corresponding to in the storage location 168 prior to the primary alive message 506 being sent to the service processor 130.

However, if the alive message period ends and the timer 138 expires, the service processor 130 can determine that service processor 120 (operating as the master BMC) has failed. The service processor 130 can then complete the context switch process and begin operating as the master BMC. In an embodiment, when the service processor 130 begins operating as the master BMC, the service processor 130 can monitor the communication bus 170 for alive messages from service processors 140 and 150, can have ownership to write data to the storage location 168 in the shared system memory 118, and the like. The service processor 130 can then set the timer 138 to the next to expire expiration timer value in the storage location 168, and send a rest signal 508 to the service processor 120. In an embodiment, the service processor 130 can convert all of the expiration timer values in the storage location 168 to the clock of device 104, such that further conversion of these values is not needed while the service processor 130 is the master BMC.

Upon the service processor 120 completing the reset, the service processor 120 can take over as the master BMC, and can provide a secondary signal to the service processor 130. In an embodiment, the secondary signal can cause the service processor 130 to perform a context switch to begin operating as the secondary BMC. In an embodiment, the service processor 120 can convert all of the expiration timer values in the storage location 168 back to the clock of device 102. In an embodiment, the reset operation of the service processor 120 can be a short enough time that a new secondary BMC is not needed. However, in another embodiment, the service processor 130 may determine that a new secondary BMC should be configured while service processor 120 is reset. In this embodiment, the service processor 130 can select either service processor 140 or service processor 150 to operate as the new secondary BMC while the service processor 120 is being reset. Thus, the distributed BMC functionality across the service processors 120, 130, 140, and 150 can enable the server board 100 to continue to operate even if one of the BMCs fail.

Figure 6:
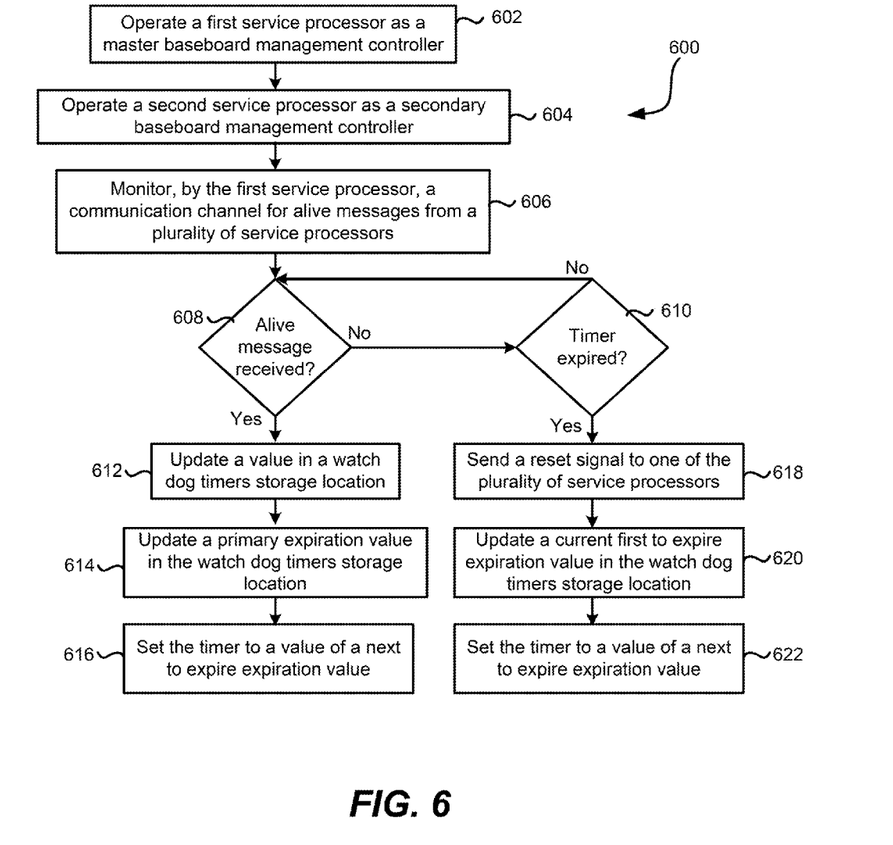
FIG. 6 illustrates a flow diagram of a method for operating a service processor as a master baseboard management controller in accordance with at least one embodiment of the present disclosure.

FIG. 6 illustrates a flow diagram of a method 600 for operating a service processor as a master baseboard management controller in accordance with at least one embodiment of the present disclosure. At block 602, a first service processor is operated as a master baseboard management controller of a server board. In an embodiment, the first service processor can be the service processor 120 of FIGS. 1-5. A second service processor is operated as a secondary baseboard management controller at block 604. In an embodiment, the second service processor can be the service processor 130 of FIGS. 1-5. At block 606, a communication channel is monitored, by the first service processor, for alive messages from a plurality of service processors that includes the second service processor. In an embodiment, the service processors can communicate in compliance with the IPMI standard. At block 608, a determination is made whether an alive message is received.

If an alive message is not received, a determination is made whether a timer has expired at block 610. In an embodiment, the timer can a timer of the first service processor that is acting as the master baseboard management controller, and is set to a next to expire expiration timer value in a storage location of a shared memory in the server board. However, if an alive message is received at block 608, the flow continues at block 612 and a value in a storage location is updated. In an embodiment, the value in the watch dog timer can correspond to a slave BMC service processor that provided the alive message to the first service processor. A primary expiration timer value is updated in the storage location at block 614. In an embodiment, the primary expiration timer value can be the expiration timer value for the first service processor in the storage location. At block 616, the timer is set to a value of a next to expire expiration value of the storage location.

Referring now to block 610, if the timer has expired, the flow continues at block 618 and a reset signal is sent to one of the plurality of services processors. In an embodiment, the reset signal can be sent to the service processor corresponding to a current first to expire expiration value in the storage location. At block 620, the current first to expire expiration value is updated in the storage location. In an embodiment, the current first to expire expiration value can be the expiration value for the service processor that is reset via the reset signal. In an embodiment, the updated expiration value is set equal to a current time stamp plus the amount of time needed to re-boot the service processor. The timer is set to a value of the next to expire expiration timer value at block 622. In an embodiment, the next to expire expiration timer value is minimum value in the storage location.

Figure 7:
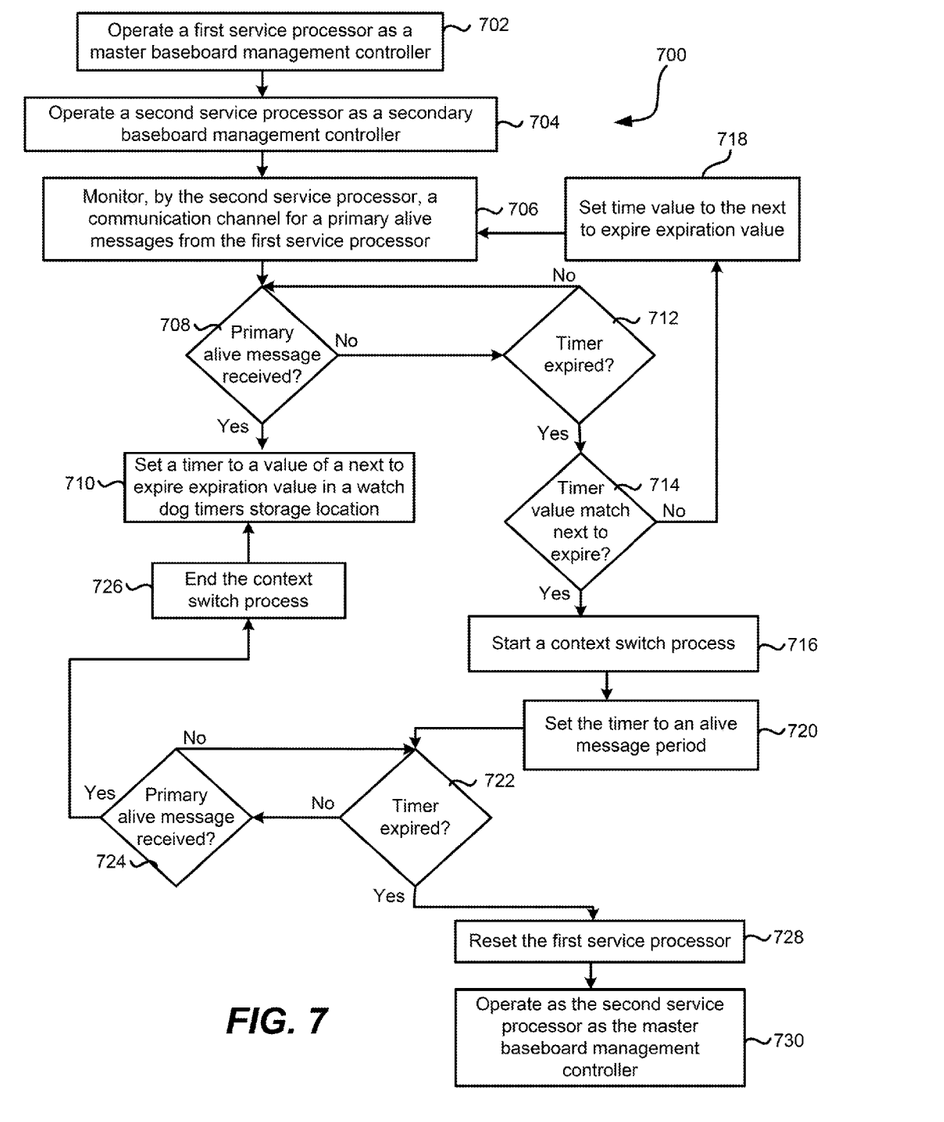
FIG. 7 illustrates a flow diagram of a method for operating a service processor as a secondary baseboard management controller in accordance with at least one embodiment of the present disclosure.

FIG. 7 illustrates a flow diagram of a method 700 for operating a service processor as a secondary baseboard management controller in accordance with at least one embodiment of the present disclosure. At block 702, a first service processor is operated as a master baseboard management controller. In an embodiment, the first service processor can be the service processor 120 of FIGS. 1-5. A second service processor is operated as a secondary baseboard management controller at block 704. In an embodiment, the second service processor can be the service processor 130 of FIGS. 1-5. At block 706, a communication channel is monitored, by the second service processor, for a primary alive message from the first service processor. In an embodiment, the service processors can communicate in compliance with the IPMI standard. At block 708, a determination is made whether a primary alive message is received.

If the primary alive message is received, a timer is set to a value of a next to expire expiration value in a storage location at block 710. In an embodiment, the timer is located within the second service processor. If the primary alive message is not received, a determination is made whether the timer has expired at block 712. If the timer has expired the flow continues at block 714, otherwise the flow returns to block 708. Thus, the combination of blocks 708 and 712 cause the second service processor to determine whether the primary alive message is received prior to the timer having expired. In an embodiment, the service processor 130 of FIGS. 1-5 can determine whether the primary alive message is received prior to the timer having expired.

At block 714, a determination is made whether the value of the timer matches the next to expire expiration value in a storage location. If the values match the flow continues at block 716 below, otherwise the value of the timer is set to the next to expire expiration value in a storage location at block 718 and the flow continues as stated above at block 706. At block 716, a context switch process is started at the second service processor, and a primary alive message request is sent to the first service processor. In an embodiment, the start of the context switch process can include retrieving and loading the code associated with the master BMC functionality in a memory associated with the second service processor. In an embodiment, the master BMC functionality can include a reception address for the alive messages from slave BMC service processors, ownership of a storage location in a shared system memory, and the like. In an embodiment, the primary alive message request can be a request to determine whether the primary BMC is alive. The timer is set to an alive message period at block 720. In an embodiment, the alive message period is a preset amount of time that the first service processor has to provide a primary alive message to the second service processor.

At block 722, a determination is made whether the timer has expired. At block 724, a determination is made whether the primary alive message is received. Blocks 722 and 724 form a loop, such that the second service processor can determine whether the primary alive message is received or the timer has expired first. In response to the primary alive message being received before the timer has expired, the flow continues at block 726 and the context switch process is ended. In response to the timer expiring before the primary alive message being received, the flow continues at block 728 and the first service processor is reset. At block 730, the second service processor is operated as the master baseboard management controller.

According to one aspect, a server board is disclosed in accordance with at least one embodiment of the present disclosure. The server board includes a first device and a second device. The first device includes one or more general purpose processors configured to execute instructions. The first device also includes a first timer including a first storage location configured to store an expiration timer value. The first device further includes a first service processor that is configured as a master baseboard management controller of the server board to monitor a communication channel for alive messages from a plurality service processors corresponding to a plurality of other devices including the second device.

The second device includes one or more general purpose processors configured to execute instructions. The second device also includes a second timer including a second storage location configured to store an expiration timer value. The second device further includes a second service processor. The second service processor is configured as a secondary baseboard management controller of the server board when the first service processor is configured as the master baseboard management controller. The second service processor is configured to start a switchover process to operate as the master baseboard management controller, instead of the secondary baseboard management controller, in response to the second timer expiring based on a first value, and is configured to also reset the second timer to a second value based on an alive message period in response to the second timer expiring based on the first value. The second service processor is further configured to reset the first service processor and to complete the switchover process to operate as the master baseboard management controller in response to the second timer expiring based on the second value prior to a primary alive message being received from the first service processor.

In an embodiment, the first service processor is further configured to update a third expiration timer value of a third device in a storage location of a shared memory in response to an alive message being received from the third device, otherwise the first service processor is configured to send, to the third device, a reset signal in response to the first timer expiring prior to the alive message being received from the third device; the first service processor further configured to utilize expiration timer values in the storage location of the shared memory to update the first memory of the first timer. In an embodiment, the first memory of the first timer is updated with an expiration timer value of the shared memory in response to the alive message being received from the third service processor.

In an embodiment, the second service processor is further configured to reset the second timer to a next to expire expiration timer value in the storage location of the shared memory in response to receiving the primary alive message. In an embodiment, second service processor is further configured to, during the switchover process, send an alive message request to the first service processor, and to start a context switch to take over master baseboard management controller tasks.

In an embodiment, the first service processor is further configured to, in response to the first timer expiring, update a third expiration timer value, in the storage location of the shared memory, of a third device to create an updated third expiration timer value that equals a time stamp value plus a boot period value, to reset the third device, and reset the first timer to a value of a next to expire expiration value in the storage location of the shared memory. In an embodiment, the plurality of service processors operate as slave baseboard management controllers.

According to another aspect, a server board is disclosed in accordance with at least one embodiment of the present disclosure. The server board includes a first device, a second device, and a third device. The first device includes one or more general purpose processors to execute instructions. The first device also includes a first timer including a first storage location to store an expiration timer value. The first device further includes a first service processor. The first service processor is configured as a master baseboard management controller of the server board to monitor a communication channel for alive messages from a plurality service processors corresponding to a plurality of other devices including the second device and the third device. The first service processor is configured to update a third expiration timer value of the third device in a storage location of a shared memory in response to an alive message being received from the third device. The first service processor is further configured to send, to the third device, a reset signal in response to the first timer expiring prior to the alive message being received from the third device.

The second device includes one or more general purpose processors to execute instructions. The second device also includes a second storage location to store an expiration timer value. The second device further includes a second service processor. The second service processor is configured as a secondary baseboard management controller of the server board when the first service processor is configured as the master baseboard management controller. The second service processor is configured to start a switchover process to operate as the master baseboard management controller, instead of the secondary baseboard management controller, in response to the second timer expiring based on a first value, and is configured to also reset the second timer to a second value based on an alive message period in response to the second timer expiring based on the first value. The second service processor is further configured to reset first service processor and to complete the switchover process to operate as the master baseboard management controller in response to the second timer expiring based on the second value prior to a primary alive message being received from the first service processor.

In an embodiment, the first service processor is further configured to update an expiration timer value associated with the first service processor in the storage location of the shared memory in response to the alive message being received from the one of the third service processor. In an embodiment, the second service processor is further configured to reset the second timer to a next to expire expiration timer value in the storage location of the shared memory in response to receiving the primary alive message. In an embodiment, the second service processor is further configured to, during the switchover process, send an alive message request to the first service processor, and to start a context switch to take over master baseboard management controller tasks. In an embodiment, the first service processor is further configured to, in response to the first timer expiring, update a third expiration timer value of the third device to create an updated third expiration timer value that equals a time stamp value plus a boot period value, to reset a third service processor of the third device, and set the first timer to a value of a next to expire expiration value in the storage location of the shared memory. In an embodiment, the plurality of service processors operate as slave baseboard management controllers.

According to another aspect, a method is disclosed in accordance with at least one embodiment of the present disclosure. The method includes monitoring, by a first service processor, a communication channel for alive messages from a plurality of service processors corresponding to a plurality of other devices including a second device and a third device. In an embodiment, the plurality of service processors operate as slave baseboard management controllers. The method also includes updating, by the first service processor, a third expiration timer value of the third device in a storage location of a shared memory in response to an alive message being received from a third service processor of the third device over the communication channel. The method further includes sending, by the first service processor, a primary alive message to a second service processor of the second device in response to a first alive message being received from the third service processor. The method also includes resetting, by the first service processor, the third device in response to a first timer expiring prior to a first alive message being received from the third service processor.

In an embodiment, the method also includes operating, the second service processor of the second device, as a secondary baseboard management controller of the server board. The method further includes in response to a determination that a second timer has expired based on a first value: starting a switchover process; resetting the second timer to a second value based on an alive message period; and in response to a primary alive message not being received from the first service processor prior to the second timer expiring based on the second value: resetting the first service processor; and operating, the second service processor, as the master baseboard management controller.

In an embodiment, the method also includes setting, by the second service processor, the second timer to a next to expire expiration value in the storage location in response to receiving the primary alive message. In an embodiment, during the switchover process, the method further includes: sending, by the second service processor, an alive message request to the first service processor; and starting, by the second service processor, a context switch to take over master baseboard management controller tasks.

In an embodiment, the method further includes setting, by the first service processor, a first timer of the first service processor to a value of a next to expire expiration value in the storage location of the shared memory in response to the first alive message being received from the third service processor. In an embodiment, the method also includes updating, by the first service processor, a primary expiration value in the storage location of the shared memory in response to receiving the alive message from the third service processor. In an embodiment, the method further includes in response to the first timer expiring: updating, by the first service processor, a third expiration timer value of the third device to create an updated third expiration timer value that equals a time stamp value plus a boot period value; resetting a third service processor of the third device; and setting the first timer to a value of a next to expire expiration value in the storage location of the shared memory.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof. For example, one skilled in the art would appreciate that a data processing system, such as a computer having an instruction based data processor, can be used to implement the analysis described herein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A server board comprising:
   a first device comprising
      one or more general purpose processors configured to execute instructions,
      a first timer including a first storage location configured to store an expiration timer value, and
      a first service processor, wherein the first service processor is configured as a master baseboard management controller of the server board to monitor a communication channel for alive messages from a plurality service processors corresponding to a plurality of other devices including a second device; and
   the second device comprising
      one or more general purpose processors configured to execute instructions,
      a second timer including a second storage location configured to store an expiration timer value, and
      a second service processor, wherein
         the second service processor is configured as a secondary baseboard management controller of the server board when the first service processor is configured as the master baseboard management controller,
         the second service processor is configured to start a switchover process to operate as the master baseboard management controller, instead of the secondary baseboard management controller, in response to the second timer expiring based on a first value, and is configured to also reset the second timer to a second value based on an alive message period in response to the second timer expiring based on the first value,
         the second service processor is further configured to reset the first service processor and to complete the switchover process to operate as the master baseboard management controller in response to the second timer expiring based on the second value prior to a primary alive message being received from the first service processor.

2. The server board of claim 1, wherein the first service processor is further configured to update a third expiration timer value of a third device in a storage location of a shared memory in response to an alive message being received from the third device, otherwise the first service processor is configured to send, to the third device, a reset signal in response to the first timer expiring prior to the alive message being received from the third device; the first service processor further configured to utilize expiration timer values in the storage location of the shared memory to update the first memory of the first timer.

3. The server board of claim 2, wherein the first memory of the first timer is updated with an expiration timer value of the shared memory in response to the alive message being received from the third service processor.

4. The server board of claim 1, the second service processor is further configured to reset the second timer to a next to expire expiration timer value in the storage location of the shared memory in response to receiving the primary alive message.

5. The server board of claim 1, wherein the second service processor is further configured to, during the switchover process, send an alive message request to the first service processor, and to start a context switch to take over master baseboard management controller tasks.

6. The server board of claim 1, wherein the first service processor is further configured to, in response to the first timer expiring, update a third expiration timer value, in the storage location of the shared memory, of a third device to create an updated third expiration timer value that equals a time stamp value plus a boot period value, to reset the third device, and reset the first timer to a value of a next to expire expiration value in the storage location of the shared memory.

7. The server board of claim 1, wherein the plurality of service processors operate as slave baseboard management controllers.

8. A server board comprising:
   a first device comprising
      one or more general purpose processors to execute instructions;
      a first timer including a first storage location to store an expiration timer value; and
      a first service processor, wherein
         the first service processor is configured as a master baseboard management controller of the server board to monitor a communication channel for alive messages from a plurality service processors corresponding to a plurality of other devices including a second device and a third device,
         the first service processor is configured to update a third expiration timer value of the third device in a storage location of a shared memory in response to an alive message being received from the third device, and
         the first service processor is further configured to send, to the third device, a reset signal in response to the first timer expiring prior to the alive message being received from the third device; and
   the second device comprising
      one or more general purpose processors to execute instructions;
      a second timer including a second storage location to store an expiration timer value; and
      a second service processor, wherein
         the second service processor is configured as a secondary baseboard management controller of the server board when the first service processor is configured as the master baseboard management controller,
         the second service processor is configured to start a switchover process to operate as the master baseboard management controller, instead of the secondary baseboard management controller, in response to the second timer expiring based on a first value, and is configured to also reset the second timer to a second value based on an alive message period in response to the second timer expiring based on the first value, and the second service processor is further configured to reset first service processor and to complete the switchover process to operate as the master baseboard management controller in response to the second timer expiring based on the second value prior to a primary alive message being received from the first service processor.

9. The server board of claim 8, the first service processor is further configured to update an expiration timer value associated with the first service processor in the storage location of the shared memory in response to the alive message being received from the one of the third service processor.

10. The server board of claim 8, the second service processor is further configured to reset the second timer to a next to expire expiration timer value in the storage location of the shared memory in response to receiving the primary alive message.

11. The server board of claim 8, wherein the second service processor is further configured to, during the switchover process, send an alive message request to the first service processor, and to start a context switch to take over master baseboard management controller tasks.

12. The server board of claim 8, wherein the first service processor is further configured to, in response to the first timer expiring, update a third expiration timer value of the third device to create an updated third expiration timer value that equals a time stamp value plus a boot period value, to reset a third service processor of the third device, and set the first timer to a value of a next to expire expiration value in the storage location of the shared memory.

13. The server board of claim 8, wherein the plurality of service processors operate as slave baseboard management controllers.

14. A method comprising:
monitoring, by a first service processor, a communication channel for alive messages from a plurality of service processors corresponding to a plurality of other devices including a second device and a third device, wherein the plurality of service processors operate as slave baseboard management controllers;
updating, by the first service processor, a third expiration timer value of the third device in a storage location of a shared memory in response to an alive message being received from a third service processor of the third device over the communication channel;
sending, by the first service processor, a primary alive message to a second service processor of the second device in response to a first alive message being received from the third service processor; and resetting, by the first service processor, the third device in response to a first timer expiring prior to a first alive message being received from the third service processor.

15. The method of claim 14 further comprising:
operating, the second service processor of the second device, as a secondary baseboard management controller of the server board;
in response to a determination that a second timer has expired based on a first value:
starting a switchover process;
resetting the second timer to a second value based on an alive message period; and
in response to a primary alive message not being received from the first service processor prior to the second timer expiring based on the second value:
resetting the first service processor; and
operating, the second service processor, as the master baseboard management controller.

16. The method of claim 15, further comprising:
setting, by the second service processor, the second timer to a next to expire expiration value in the storage location in response to receiving the primary alive message.

17. The method of claim 15, wherein during the switchover process, the method further comprising:
sending, by the second service processor, an alive message request to the first service processor; and
starting, by the second service processor, a context switch to take over master baseboard management controller tasks.

18. The method of claim 14 further comprising:
Setting, by the first service processor, a first timer of the first service processor to a value of a next to expire expiration value in the storage location of the shared memory in response to the first alive message being received from the third service processor.

19. The method of claim 14, further comprising:
updating, by the first service processor, a primary expiration value in the storage location of the shared memory in response to receiving the alive message from the third service processor.

20. The method of claim 14, further comprising:
in response to the first timer expiring:
updating, by the first service processor, a third expiration timer value of the third device to create an updated third expiration timer value that equals a time stamp value plus a boot period value;
resetting a third service processor of the third device; and
setting the first timer to a value of a next to expire expiration value in the storage location of the shared memory.

* * * * *